United States Patent [19]

Bässler

[11] 4,039,263
[45] Aug. 2, 1977

[54] CONNECTOR JOINT

[76] Inventor: Otto Bässler, Bahnhofstr. 29, 7504 Weingarten, Germany

[21] Appl. No.: 683,023

[22] Filed: May 4, 1976

[30] Foreign Application Priority Data

May 7, 1975 Germany .............................. 2520510

[51] Int. Cl.² .............................................. F16D 3/00
[52] U.S. Cl. .................................. 403/218; 403/403; 403/405
[58] Field of Search ............... 403/217, 218, 219, 347, 403/391, 403, 405, 49

[56] References Cited

U.S. PATENT DOCUMENTS

| 2,018,539 | 10/1935 | Welsh | 403/218 |
| 2,621,384 | 12/1952 | Slaughter | 403/391 X |
| 3,512,813 | 5/1970 | Brimberg | 403/218 |
| 3,677,582 | 7/1972 | Flick | 403/391 |
| 3,682,504 | 8/1972 | Brimberg | 403/218 X |

FOREIGN PATENT DOCUMENTS

| 524,831 | 4/1955 | Italy | 403/391 |
| 465,328 | 12/1968 | Switzerland | 403/391 |
| 630,409 | 10/1949 | United Kingdom | 403/391 |

Primary Examiner—Wayne L. Shedd
Attorney, Agent, or Firm—Michael J. Striker

[57] ABSTRACT

A plurality of rods are connected together so as to lie in respective relatively orthogonal planes by means of a joint that has three parts held together by a fastener. This joint is formed with three pairs of holes, each pair of holes lying on a respective axis perpendicular to the axes of the other pairs and each hole of each pair opening in a direction opposite the other hole of the pair. Each hole is formed by a recess in one of the joint parts and a matching recess in another joint part, so that two of the joint parts each have three such recesses and the third joint part has six. The fastener can be a bolt engageable through all three parts.

8 Claims, 5 Drawing Figures

CONNECTOR JOINT

BACKGROUND OF THE INVENTION

The invention relates to a connector joint for rod-like elements for forming in particular three-dimensional carrying or support frames.

It is known in the construction of support frames to use joints which are provided with uniformly spaced threaded holes in which similarly threaded rods can be screwed.

The disadvantage of this system is that the connector elements, i.e. the joints, and rods must be provided with threads. Since in addition the rods must be rotated to screw them in they must be subdivided so that the threaded sections can be rotated relative to each other and fixed.

It is also known to form joints out of elastic material and to provide the connector rods on their ends with ball-shaped heads which snap into correspondingly ball-shaped recesses in the joints.

Connections of this type can however only withstand small forces.

SUMMARY OF THE INVENTION

The present invention has the object of providing a connector joint which makes it easy to connect a plurality of rod-shaped elements surely and reliably and with minimum effort.

This is achieved according to the present invention by forming the joint out of three segments which are held together and braced by a single connecting member.

The joint has preferably six bores for holding the connector rods, two in each coordinate direction, with their center axes intersecting in the center of the joint. The connector rods are thereby all aligned with the central point of the joint.

The connector joint itself can be shaped as a ball, a cube, a frustooctohedron, or a cubicodihedron, preferably however the segments can be put together generally to form a ball. Each segment is thus provided with recesses which in assembled condition of the segments form the bores for the connector rods or connector tubes. When used with cylindrical connector rods or connector tubes these recesses are formed generally half-cylindrically in the separate segments.

The two outer segments are substantially identical and each of them advantageously has three such recesses, whereas the central generally annularly formed segment has on each side three such recesses and therefore each recess of the middle segment together with a respective recess of one of the outer segments forms a bore for the a connector rod.

The connecting member by which the segments are clamped together with the inserted rods or tubes can be a screw or even an eccentric. It extends through the middle point of the joint and is supported in both of the outer segments.

In order to support tension forces the bores advantageously are provided with devices for anchoring the connecting rods or connecting tubes. Such a device can for example be formed as a pin extending transversely to the respective bore, this pin being adjustable and engaging in a corresponding recess on the end of the rod or tube slipped into the recess.

The connecting elements, i.e. the rods or tubes, can also be formed on their ends with ridges or can carry a transverse pin or a transversely projecting nose so that pulling forces can be withstood. Finally, it is possible to provide the bores of the joint with a groove or ridge on which a corresponding ridge which is formed on the connecting elements engages or vice versa.

BRIEF DESCRIPTION OF THE DRAWINGS

An exemplary embodiment of the invention is described below with reference to the drawing in which.

SPECIFIC DESCRIPTION OF PREFERRED EMBODIMENTS

Figure 1:
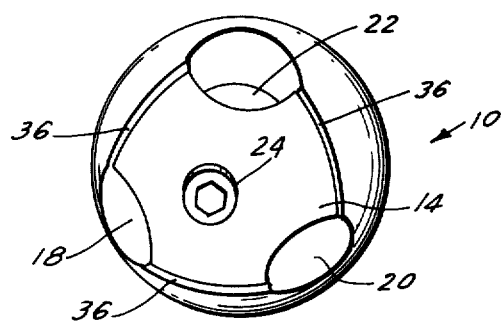
FIG. 1 shows a joint in perspective view.

The joint 10 according to FIG. 1 has in accordance with the embodiment shown and described here the approximate shape of a ball although, as mentioned above, other shapes are possible. The joint can be conceived as a ball which is provided with three throughgoing bores which extend along the three spacial coordinate axes and whose central axes intersect at the center of the ball. This form is then subdivided into three segments.

In practice the joint 10 is formed of three segments 12, 14 and 16 which are formed of metal, of synthetic-resin material, or even of wood.

Preferably the three segments are formed of metal, e.g. aluminum, and they can be made by a casting process.

When the three castings or the three segments 12, 14 and 16 are put together they form the joint which is provided with six bores for insertion of connecting elements, i.e. the rods or tubes. In FIG. 1 only three bores 18, 20 and 22 are shown which lie along the three spatial coordinate directions. The half of the ball not visible in FIG. 1 is provided with three bores forming continuations of the three visible bores.

Figure 2:
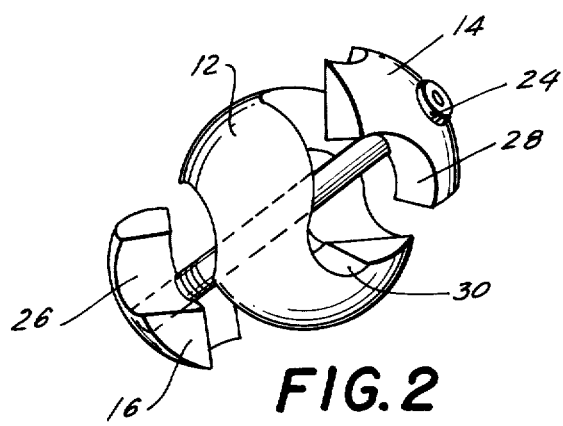
FIG. 2 shows the joint according to FIG. 1 in disassembled condition.

As shown in FIG. 2 the three segments are connected together by a connecting member, in this case a screw 24, and can be clamped against each other. The screw 24 extends through the spatial center of the joint and bears on the outer segments 14 and 16. The segment 16 itself has a threaded bore, preferably it has on its outside a not-illustrated recess in which for example a hexagonal nut can be inserted or pressed in so that it does not fall out, and in which the screw 24 can be screwed. The head of the screw 24 is preferably also recessed in the segment 14.

The individual segments are in the illustrated embodiment parts of a ball wherein the two outer segments 14 and 16 have the same form, as cut out from a ball, whereas the central segment has an annular shape which extends from a ball zone.

The segment 14 has three generally half-cylindrical recesses 28 and the segment 16 has three corresponding half-cylindrical recesses 26. The shape of the recesses depends on the connecting rods or tubes being used. When cylindrical rods or tubes are used the recesses are half cylindrical, i.e. shaped to fit against the connecting rods or tubes. When rods are used with rectangular or quadratic section the recesses in the segments are correspondingly shaped and correspond to the respective tube cross-section. Tubes with quadratic section can for instance be used with a connecting joint having the shape of an octahedron.

The three recesses 26, i.e. their axes, extend along the three spatial mutually perpendicular coordinate axes. The same is true for the three recesses 28 of the segment 14.

The central segment 12 has a total of six such recesses, namely three recesses 30 on the side turned toward the segment 14 and three recesses 32 on the side turned toward the segment 16. The recesses 32 are off-set to the recesses 30 as shown in FIG. 2.

The recesses 30 whose central axes also run along the three spatial coordinate axes together form with the recesses 28 of the segment 14 three of the bores for the connecting rods (when the term connecting rod is used in the description it applies equally to connecting tubes).

The three recesses 32 whose central axes also extend along the spatial coordinate axes together form with three recesses 26 of the segment 16 the three other bores for the connecting rods. The recesses 30 and 32 have when used with cylindrical connecting rods also a substantially half-cylindrical shape. It has been mentioned that the central axes of the bores (of which FIG. 1 shows the bores 18, 20 and 22) extend along the three spatial mutually perpendicular coordinate axes and intersect at the center of the joint.

Figure 3:
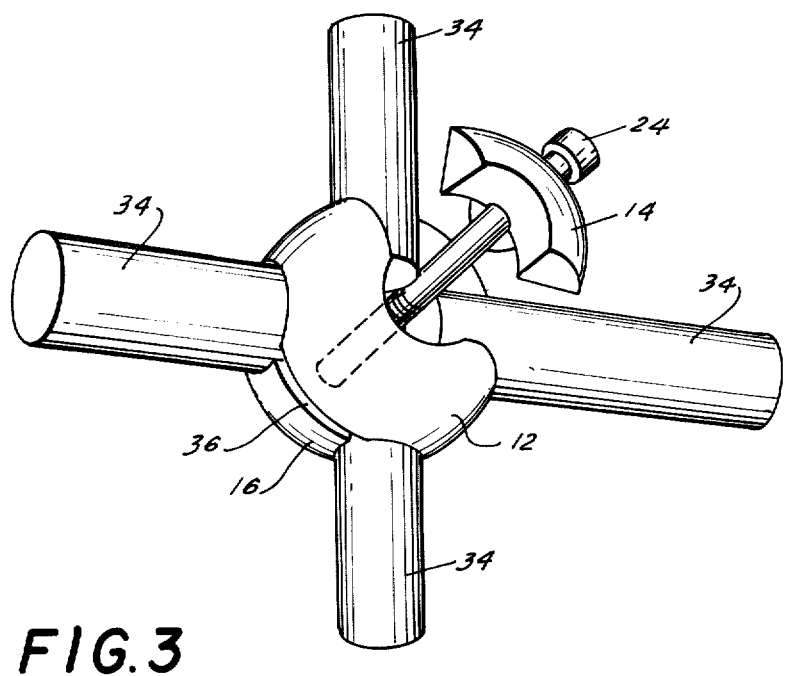
FIG. 3 shows a joint with four inserted connecting rods.

FIG. 3 shows the joint with four inserted connecting rods 34 which according to the embodiment of FIG. 3 lie in a plane. The segment 14 is not yet set in place. On assembly the three segments are screwed together by the screw 24 so that the rods 34 in the bores are clamped between the segments and held thereby. In this manner it is important to note that even in the screwed-together and clamped condition spaces 36 are left between the individual segments, as otherwise no pressure could be exerted on the rods 34.

Figure 4:
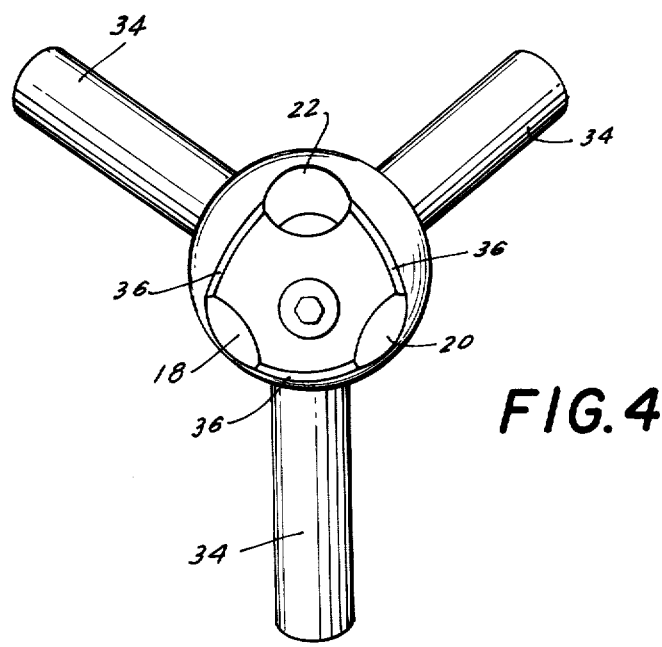
FIG. 4 shows a joint with three connecting rods inserted in three cordinate directions.

FIG. 4 shows the joint in the same type of view as FIG. 1, however the bores which lie across from the shown bores 18, 20 and 22 receive rods 34 which here extend along three coordinate directions.

Figure 5:
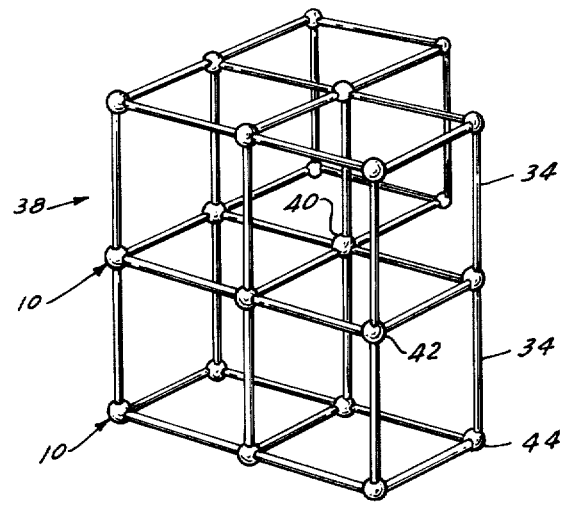
FIG. 5 shows a support frame formed of joints and connecting rods or connecting tubes.

FIG. 5 shows a structure built out of joints 10 and rods 34. As shown in the Figure six connecting rods engage for example in the central joint 40, whereas four in the joint 42 and three in the joint 44 (it is possible in the shown embodiment to use any number from one to six). The joint and/or the connecting rods can be provided with means for withstanding tension forces. For example the segments can be formed with transverse bores through which a pin is slidable that engages in corresponding bores in the ends of the rods. On the other hand the rods can each have on their inner end engaged in the joint a rim, a laterally projecting nose, or a transverse pin which prevents a withdrawal of the rods from the bores. Finally the connecting bores can be provided with recesses or ridges on which corresponding ridges of the rods engage or the rods can have grooves or similar recesses in which corresponding ridges, projections or noses engage that are formed in the bores.

The individual segments of the joint can be produced easily and cheaply, for example by casting. They hardly need to be machined at all after casting. Even the rods or tubes themselves need no further machining and can be used in any desired position or needed length.

The individual rods are oriented axially toward the central point of the joint and there are altogether in the illustrated embodiment up to six possible connections. The joint is easy to put together and take apart.

They can be used for all kinds of support structures or frameworks, in particular for decoration, shelves, frames, openworks, for furniture feet, stands, and for toys.

I claim:

1. A three-dimensional assembly comprising:
 a plurality of elongated rods having rod ends;
 a joint having
  a pair of generally identical outer parts each having an outer face formed with three outer recesses, and
  an annular inner part having a pair of inner faces each formed with three inner recesses and each snugly interfittable with a respective outer face with each of said inner recesses aligned with and forming with a respective one of said outer recesses a respective bore generally coaxial with another of said bores and forming therewith a bore pair lying on a respective axis generally perpendicular to the axes of the other bore pairs, each of said bores opening axially oppositely to the other bore of the respective pair and being shaped to receive a respective rod end; and
 means for securing together said parts and thereby clamping said ends in said bores therebetween.

2. The assembly defined in claim 1 wherein said means includes a screw engageable through said parts.

3. The assembly defined in claim 1 wherein said means includes an eccentric.

4. The assembly defined in claim 1 wherein said means extends through the center of said joint and said axes also extend through and intersect at said center.

5. The assembly defined in claim 1, further comprising means for anchoring said ends in said bores.

6. The assembly defined in claim 5 wherein said means for anchoring includes a pin extending across each of said bores.

7. The assembly defined in claim 5 wherein said means for anchoring includes an outwardly projecting formation on each of said rods and a corresponding recess in each of said bores in which one of said formations is engageable.

8. The assembly defined in claim 5 wherein said means for anchoring includes a ridge formed on each of said ends.

* * * * *